April 5, 1960    C. B. MOORE, JR    2,931,597
SOLAR ENGINE BALLOON ALTITUDE CONTROL
Filed Jan. 28, 1954    5 Sheets-Sheet 1

INVENTOR
CHARLES B. MOORE JR.
By William C. Stueber    ATTORNEY

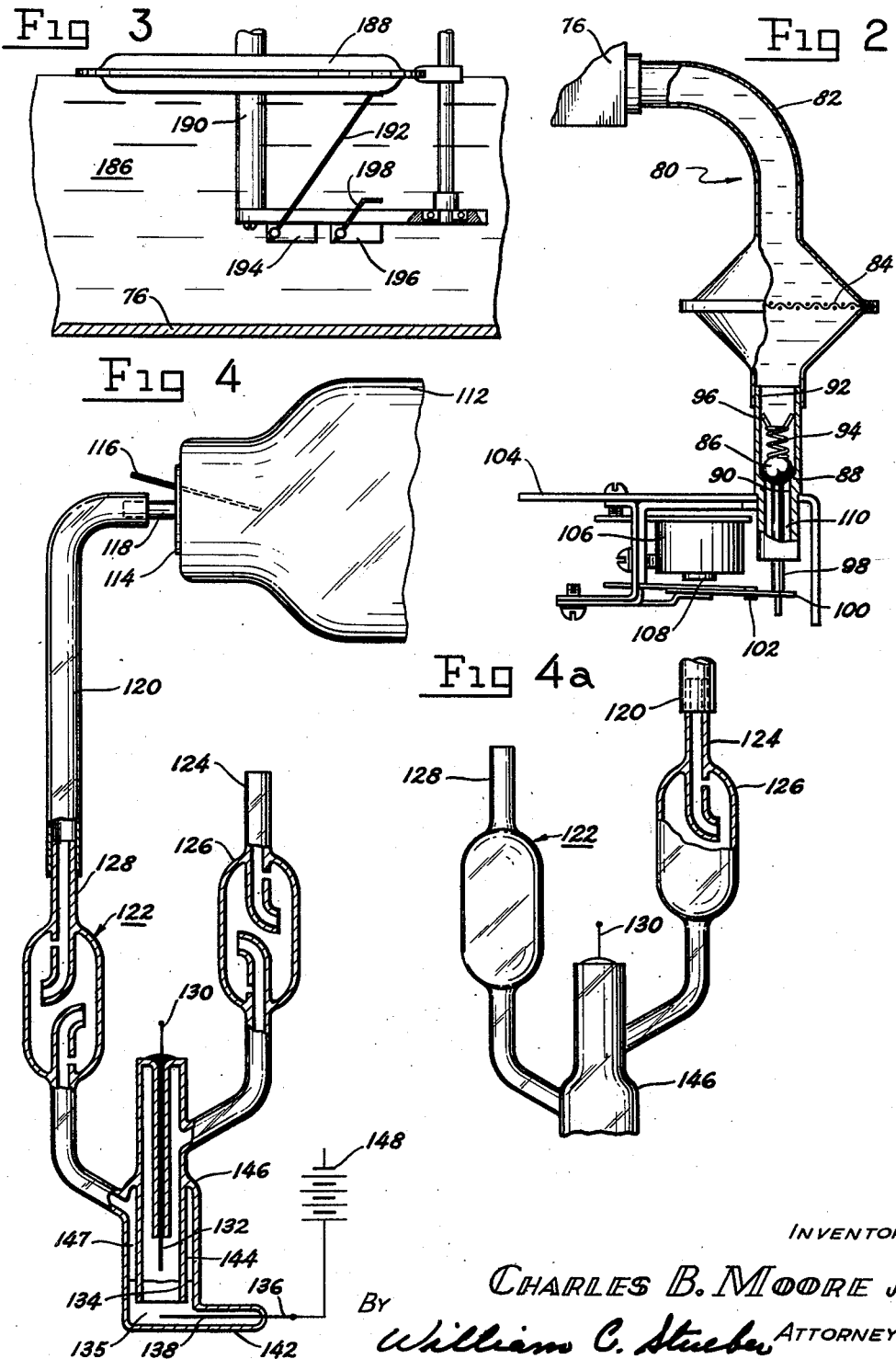

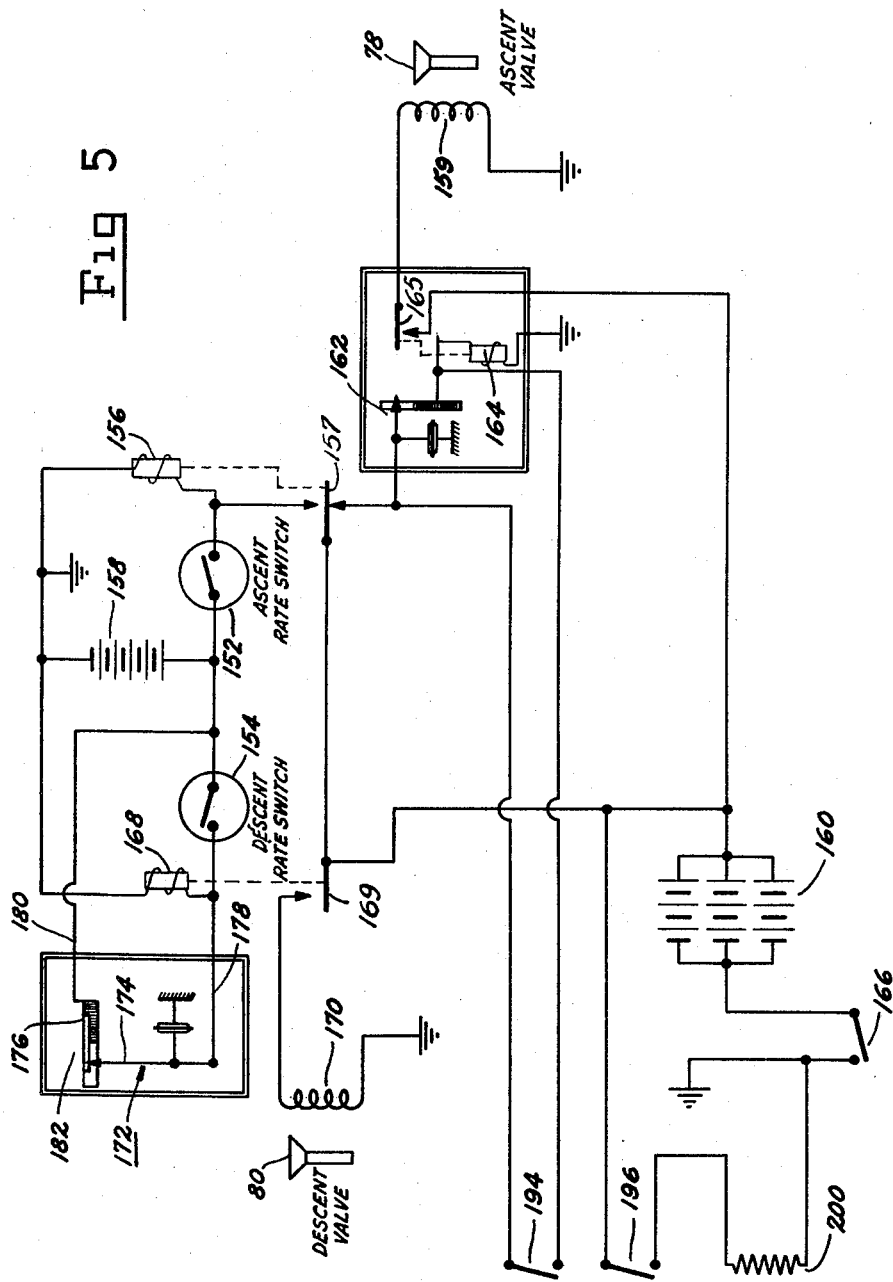

April 5, 1960 C. B. MOORE, JR 2,931,597
SOLAR ENGINE BALLOON ALTITUDE CONTROL
Filed Jan. 28, 1954 5 Sheets-Sheet 4

INVENTOR
CHARLES B. MOORE Jr.
BY William C. Stueber ATTORNEY

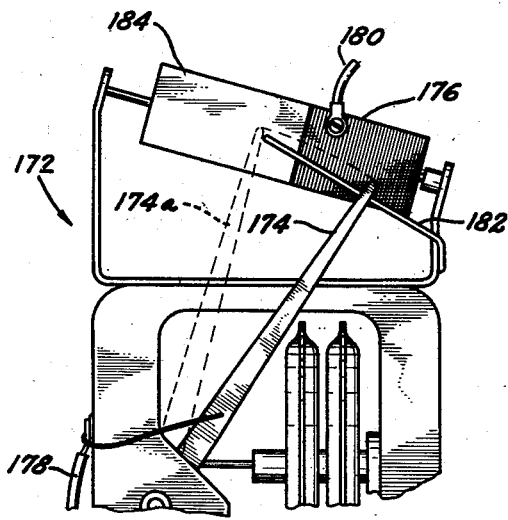
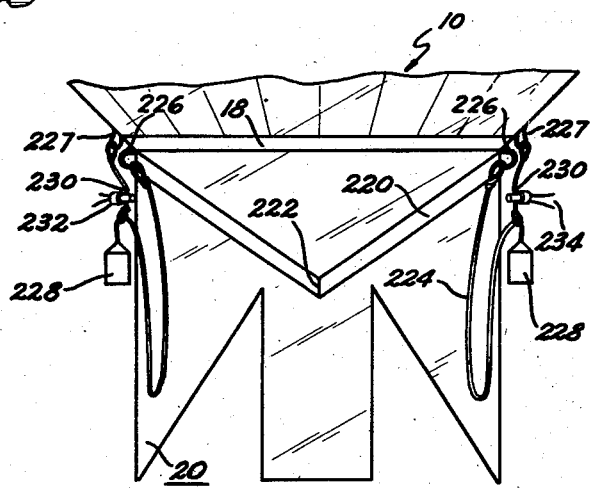
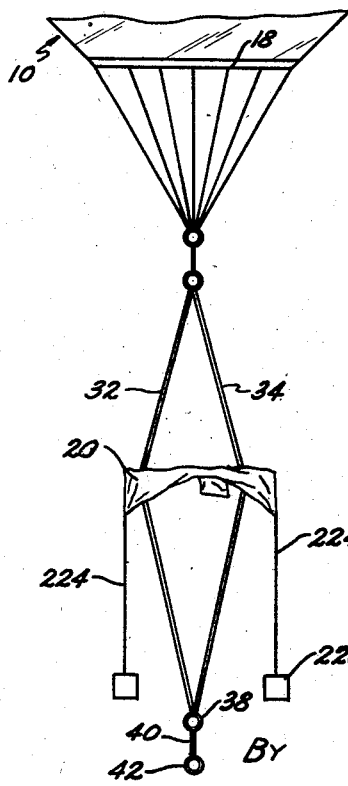

United States Patent Office 2,931,597
Patented Apr. 5, 1960

2,931,597
SOLAR ENGINE BALLOON ALTITUDE CONTROL
Charles B. Moore, Jr., Bedford, Mass., assignor to General Mills, Inc., a corporation of Delaware
Application January 28, 1954, Serial No. 406,759
23 Claims. (Cl. 244—97)

This invention relates to improvements in balloons and more specifically to improvements in apparatus for controlling the ascent or descent of the balloon for obtaining long duration flights.

Frequently, one of the prime objectives in flying large balloons which carry payloads such as scientific instruments is to extend the duration of the flights. Balloons which are adapted to carry heavy payloads are expensive to produce and require time and expense to outfit and launch. Because of their size and fragile nature and because of the distance they travel during the flight, it is usually impossible to salvage the balloon and, therefore, as much service as possible should be obtained from each flight. This is best achieved by extending the duration of the flight as long as possible.

A factor to which all flights are subjected and which cannot be readily avoid is the effect of the sun on the balloon. When the balloon is in flight during daylight hours the sun's radiation increases the temperature of the gas within the balloon causing it to expand and increasing its lifting ability. When the sun sets this solar radiation is withdrawn and the gas cools and contracts greatly, decreasing its lifting ability. If no changes are brought to bear on the balloon to decrease its load, a contraction of gas will cause it to descend. Even where a constant altitude flight is not of prime importance this descent is often so great that it takes the balloon down to altitudes where the load, such as scientific instruments, carried by the balloon are of totally no use. Further, the rates of descent due to the night cooling of the gas may be such that the air currents passing by the rapidly descending balloon cause excessive flutter of the balloon wall which may tear or otherwise damage the material.

If the loss of lift due to the withdrawal of solar radiation, which is also called the sunset effect, is compensated for by ballast drop a large amount of ballast will be consumed each night. The amount of ballast consumed may amount to about ten percent of the gross weight. When the sun rises in the morning the balloon minus the ballast will be much lighter and the solar radiation will drive the balloon to a higher altitude. At this new altitude the gas will expand to a volume larger than the balloon envelope and much will be spilled out through the appendix valve. Thus, in compensating for the sunset effect a large amount of ballast has been consumed during the night and gas has been lost during the succeeding day. Because the amount of ballast a balloon can carry is naturally limited by its lifting ability and the desire to use as much lift as possible for payloads in the form of instruments and the like, enough ballast to take the balloon through only a few sunsets could be carried at best.

If the balloon is flown so that no compensation is made for sunset effect, the descent may be so rapid that the balloon will descend to an altitude where no useful readings can be taken. Further, the rate of descent may be so large that the flutter of the balloon material will often cause it to be damaged. A fast rate of descent also increases the sunset effect in that it increases the speed of air rushing past the balloon which has a ventilation effect and the gases within the balloon are cooled even more rapidly.

It is an object of the present invention therefore to provide an improved control system for a balloon which will compensate for the effect of sunrise and sunset without requiring the dropping of a large amount of ballast so as to be able to carry sufficient ballast to continue control of the balloon and enable it to float for extremely long periods of time.

Another object of the invention is to provide an improved balloon altitude control which will compensate for sunset and sunrise effect without the loss of lifting gas through the appendix valve to thereby increase the time a balloon is capable of staying aloft.

Still another object of the invention is to provide a means of controlling the descent of a balloon which will cause the balloon to descend at a uniform rate after sunset and at a rate which will not take it below a tolerable minimum altitude before the sun again rises and the balloon is again subjected to solar radiation.

It is another object of the invention to provide a means for controlling the altitude of balloons which will automatically decrease its rate of descent so that it will not obtain a descent rate which will tear or damage the material due to the flutter effect of the air rushing past the balloon.

Another object of the invention is to provide a control for a balloon which will insure constant rise but will regulate the rate of ascent keeping it within limits which will not cause an excessive rate of rise to cause fluttering which in the low temperatures of the stratosphere may damage the balloon walls.

A further object of the invention is a means for flying a balloon which will eliminate the necessity of accurate weight offs at launching and yet which obtains for the balloon a free lift to give a required rate of rise.

Another object of the invention is to provide a rate of descent control for the balloon which will prevent the descent rate from exceeding that value which best serves to extend the flight duration in accordance with the solar engine principles.

Another object of the invention is to provide a means for extending the flight beyond the time when the ballast supply is exhausted.

Other objects and advantages will become more apparent in the following specification taken in connection with the appended drawings in which:

Fig. 2 is a front elevational view with parts broken away illustrating the details of the ballast dropping valve;

Fig. 3 is a detailed view in front elevation of the float within the ballast tank for measuring the amount of ballast remaining;

Figs. 4 and 4a are detailed elevational views partially in section illustrating the details of the rate control switches used in the preferred embodiment with Fig. 4 showing the connections used with the rate of ascent switch and Fig. 4a showing the rate of descent switch;

Fig. 5 is a diagrammatic view of the electrical circuit and controls used in the present invention;

Fig. 7 is a detailed view of the minimum altitude switch;

Fig. 8 is an elevation showing the device for tearing off the balloon appendix; and Fig. 9 is an elevation showing the appendix torn open.

Figure 1:
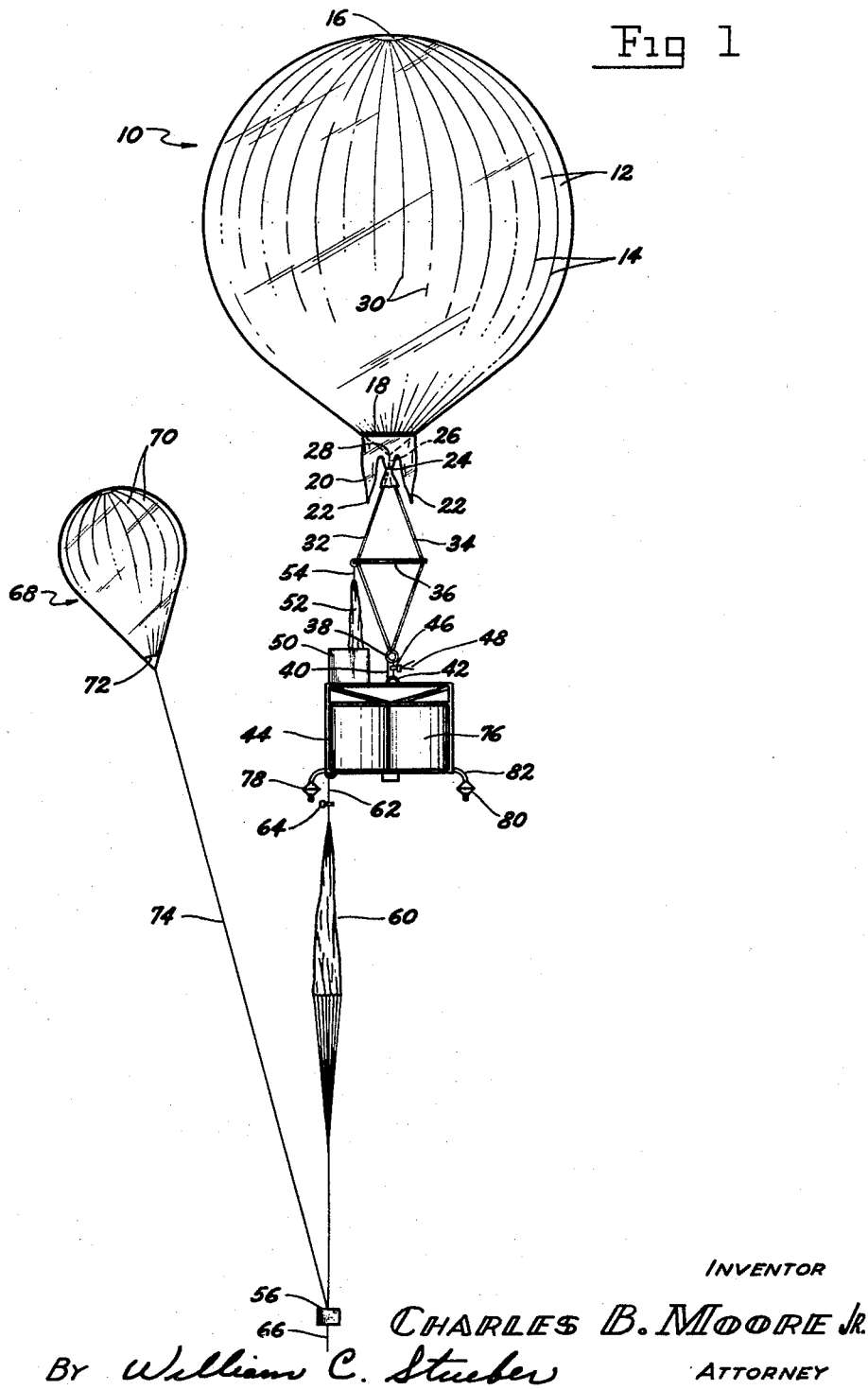
Figure 1 is an elevational view of the balloon and its control apparatus during flight.

Referring to Fig. 1, the complete balloon assembly is shown. The balloon is provided with a balloon envelope 10 which is very large in size and which is formed of a plurality of gores 12 of light weight material joined to each other by seams 14. A cap 16 covers the ends of the gores at the top of the balloon to form a gas tight seal. The gores at the lower end meet along a band 18 to which is attached the appendix 20.

The balloon as shown is completely inflated having ascended to its floating altitude. When launched the balloon envelope contains only a small bubble of gas and this bubble expands as the balloon ascends to regions of lower pressure. Any excess gas is forced out through the appendix which is divided into two branches each of which has a flattened end acting as a valve 22 which relieves any internal pressure within the balloon and prevents air from entering and mixing with the gas.

The center of the appendix 20 is gathered together to form a seal 24 around the load line 26 which supports the entire load. This line is attached at 28 to the load ring which is suspended by lines attached to the ends of the load bearing tapes 30 which extend downwardly from the top of the balloon. These tapes are positioned over the balloon seams to form a harness over the balloon envelope for distributing the weight of the load. The load line 26 is split into two lines 32 and 34 which are separated by a spreader bar 36. This bar holds the lines apart and prevents the load line from twisting while the balloon is in flight.

The spread lines 32 and 34 lead to a ring 38 which has a line 40 looped through it. The lower end of this line is looped through a ring 42 which is secured to the top of the load 44. One side of the looped line 40 has a cutting squib 46 fastened to it. This squib is of the type known to the art and is provided with an electrical means 48 which when connected in series with a battery circuit fires a small charge of powder in the squib to cut the line. This squib 46 is, in the preferred embodiment, connected to a timer and its action in dropping the load will be discussed later. The load 44 has a parachute pack 50 fastened at its top containing the folded parachute 52. The top of this parachute is connected to one end of the spreader bar 36 by a fracturable connection 54.

It will be seen from the above description that if the squib 46 is fired to break the line 40, the load will drop downwardly to pull the parachute 52 from the parachute pack 50. When the parachute has been completely withdrawn from the box the parachute lines will become taut to break the fracturable link 54 and the parachute will open to guide the load 44 gently to the ground.

The load 44 is in the form of a container which carries various components of the load such as the instruments, ballast, and operating timers and switches. The payload, which contains the elements that the balloon is designed to carry aloft, such as meteorological instruments, radios, etc., is also carried by the container indicated as the load 44.

Suspended from the bottom of the load is a parachute 60 carrying a load 56 consisting principally of a radio beacon. The parachute and radio beacon are separable from the load 44 by a line 62 which can be severed by firing the cutting squib 64. An antenna 66 may be provided hanging from the beacon.

As was previously stated, the main balloon 10 at launching is only partially inflated with gas. The amount of gas inflated within the balloon previously had to be accurately measured so that it will be capable of carrying the load aloft at the desired rate of rise. It will be readily seen that with the long length of equipment, including the load and beacon, and with so large a balloon it was very difficult to weigh off the balloon and measure its free lift. It was necessary to have a relatively accurate weigh off since if the free lift is not sufficient the balloon would have a very slow rate of rise and would not attain its floating altitude at the proper time and might not rise at all to the control altitude or to the height where the balloon becomes full due to becoming trapped at low altitudes until sunset occurs. If too much gas was introduced into the balloon, it would have too rapid a rate of rise. With rapid rise a balloon of this size is subjected to excessive flutter which may tear the material, especially when the material gets very cold at high altitudes and becomes brittle. According to the present invention, to make the weigh off less difficult and less critical, a small tow balloon 68 is used which has a known lift because it is fully inflated and its size is known. The main large balloon is then filled with the amount of gas which will give approximately zero free lift. If the amount of gas in the main balloon is slightly under the amount required, the tow balloon will still insure ascent. If the main balloon has slightly more than zero free lift, it will not create an excessive rate of rise so as to damage the main balloon since the tow balloon will gradually lose its lift which will offset the excessive lift that the main balloon has. The tow balloon may be of similar construction as the large balloon, being formed of gores 70 and having an open appendix 72 at the lower end. The tow balloon is connected to the beacon load by a line 74. Since its lift is less than the weight of the beacon, the beacon will remain suspended below the main load 44 as shown in Fig. 1.

In contrast to the partial inflation of the main balloon, the tow balloon is completely filled at ground level so that its free lift is accurately known since its volume in the fully inflated condition is known by virtue of its dimensions and design.

When the entire balloon assembly is launched, the tow balloon exerts its lift immediately and continues to influence the rate of rise of the load through the lower altitudes. As the lifting gas in the tow balloon expands, it of course escapes through the open appendix 72 of the tow balloon which thereby loses lifting ability. When the balloon reaches an altitude on the order of one-half of its full ascent, the influence of the tow balloon is practically nil, its volume being able to support only the tow balloon weight at that altitude. Since the large balloon has lost no gas its lifting ability remains the same. The free lift, which is the total lifting ability of the balloon less the weight of the load and balloon, has become less due to the loss of gas and consequent lift of the tow balloon. This loss is compensated for by drop of ballast which decreases the weight of the load and hence increases the free lift. This drop of ballast is accomplished by an automatic apparatus which will later be described.

In the main load a set of ballast tanks 76 are included. These ballast tanks are provided with valves 78 and 80 which are capable of dropping the ballast in small increments to lighten the load and thereby increase the free lift of the balloon. The tanks are interconnected but two ballast dropping valves are provided to obtain different rates of ballast drop.

A detail of one of the valves 80 is shown in Fig. 2. Since the valves are identical except for their capacity only one need be shown in detail. The valve connects to the ballast tank 76 by a tube 82. The tube has an enlarged bell portion which contains a screen 84 for filtering the ballast to prevent clogging of the valve. The liquid ballast may be of various types but is preferably a petroleum derivative which will not freeze at high altitudes. It will be seen from other portions of the description that various ballast systems could be used such as steel shot ballast controlled by a magnetic valve.

The valve 80 is comprised of a ball 86 which seats against a shoulder 88 formed by a reduced portion 90 in the valve channel 92. The valve ball is held against its seat by a spring 94 held in place by a resilient clip 96 which springs out and wedges itself in the channel 92.

For purposes of opening the valve a stem 98 bears against the lower surface of the ball. This stem is urged upwardly to open the valve by an arm 100 which is suitably connected to the valve stem and which is secured to a clapper 102 activated by an electromagnet. The electromagnet is comprised of a main frame 104 which pivotally supports the clapper and which supports the coil 106 and the core 108 of the magnet. When the coil 106 is placed in circuit with a battery the clapper 102 and arm 100 are drawn upward to force the valve stem 98 upwardly and unseat the ball valve. The ballast will then drip from the valve at a rate determined by the cross sectional area of the space 110 between the valve stem 98 and the reduced portion 90 of the valve channel.

The dropping of ballast is used to lighten the load on the balloon. This becomes necessary on two occasions. First, when the rate of ascent of the balloon becomes too slow, and second, when the rate of descent becomes too rapid.

The rates of ascent and descent are continuously measured. The measuring device which is responsive to the rate of ascent or descent activates apparatus capable of closing an electrical circuit which controls the operation of the ballast valve.

Turning now to Figure 4, the device which is sensitive to the rate of rise or descent is shown in detail. The device operates on the principle of rate of change in atmospheric pressure with change in altitude. The device is responsive to rate of change in altitude and therefore can be used to measure both descent and ascent.

The rate measuring device comprises a flask 112 which has a stopper 114 provided with a small opening in the form of a tube 116 which projects through the stopper. This small tube bleeds air into or out of the flask as the atmospheric pressure increases or drops. The flask is preferably coated with a heat reflective material and insulated so as to minimize the effect of changes in temperature and may be the type contained in the ordinary vacuum bottle or a laboratory Dewar flask. A larger tube 118 leads in to the flask through the stopper and by a tube 120 connects the interior of the flask to the liquid switch 122.

This switch is basically a container for an electrolyte which exposes one surface of the liquid electrolyte to atmospheric pressure and another surface to the pressure within the flask so that when the pressure differential reaches a predetermined level the liquid moves to either cover or to expose a contact or contacts to close or open an electrical circuit.

The branch 124 at one side of the flask is exposed to atmospheric air. This branch is a tube with an enlarged portion 126 containing several elbows which function to prevent the liquid from escaping from the tube in case it is tilted or in case severe pressure differentials are encountered. A pressure differential switch of this type is not entirely new to the art and, therefore, the complete details of this structure to prevent loss of liquid need not be explained. The other branch 128 of the liquid switch connects to the tube 120 which connects to the interior of the flask and so this branch is exposed to the pressure within the flask.

The switch itself is preferably formed of glass so as to be non-corrosive and non-conductive. A first electrical lead 130 leads down to a central well 134 in the switch to terminate in an electrode 132. Another lead 136 terminates in an electrode 138. The leads 130 and 136 are in series circuit with a battery 148 and a relay which opens and closes the circuit to the ballast valve. In order to complete the circuit between the leads 130 and 136, the liquid 135 must rise in the central well 134 to where it covers the electrode 132. The well is encircled by a shell 144 which is short of the bottom 142 of the well so that the liquid can pass underneath the shell and rise or fall in the outer annular chamber 147 between the shell and the outer case 146 of the switch.

It will be seen from the above description that if the pressure within the flask increases substantially above that of the ambient air, it will force downwardly upon the liquid in the chamber 147 forcing the liquid up in the well 134 to cover the electrode 132 thus completing the circuit and activating the relay whose contacts are in the ballast valve circuit.

If this liquid switch is placed in the ascent circuit during ascent, the air in the flask cannot bleed out fast enough to keep the pressure in the flask equal to that in the surrounding atmosphere. The pressure in the flask will always be greater during ascent and if the balloon is rising fast enough, this will cause a pressure differential sufficient to force the liquid up to cover electrode 132. If the rise of the balloon slows down, the air bleeding out of the flask will catch up somewhat with the drop in atmospheric pressure and the pressure differential will not be so great and contact 132 will be bared. Opening the circuit will cause ballast to start dropping and by thus lightening the load, will increase the rate of ascent of the balloon until the circuit again closes. The instrument will be so calibrated that the desired rate of rise will be such that air within the flask cannot escape through the bleed tube 116 fast enough to prevent a back pressure which will force the liquid to cover the terminal 132.

As was previously stated, a certain rate of rise is desirable because of the necessity for the balloon to reach control altitude within a relatively short length of time so that it will not be caught by retarding layers of stable air and will reach control altitude before sunset occurs and the gas begins to cool.

In some instances the balloon during ascent may encounter retarding layers of air which slow down or stop its ascent. Temperature inversions, for example, require the balloon to pass from a lower temperature to a higher which is the reverse from the normal ascent. In order that the balloon can penetrate these retarding layers of air, ballast is dropped in response to its decreased rate of rise which will carry it up through these layers.

If the rate switch is used as a descent switch the adaptation shown in Fig. 4a is used. In this case the same type liquid switch as shown in Fig. 4 is used except that the tube 120 is removed from the branch 128 and attached to branch 124 as shown in Fig. 4a. This means that the liquid in the well 134 will be exposed to the pressure within the flask and the liquid in the space 147 will be exposed to atmospheric pressure. When the balloon descends the ambient air pressure increases and air cannot bleed into the flask rapidly enough to equalize the pressures within and without the flask. The higher atmospheric pressure then forces the liquid to rise in the well 134. When the descent rate is sufficiently high, the liquid will rise to cover electrode 132 and close the switch. This drops ballast, slowing down the descent and the pressure in the flask has a chance to catch up enough to allow the liquid to fall away from the electrode 132 and the switch again opens. Actually, as will be seen from the later description, the switch will keep opening and closing most of the night, being called upon to drop small amounts of ballast until sunrise, when the sun's heating of the lifting gas stops the descent.

With the liquid switch shown the switch may not open to stop dropping ballast at exactly the same rate that it opened due to the surface tension of the liquid, etc. but the variances in rate are small and do not harm satisfactory operation.

Referring now to Fig. 5, the detailed circuit for controlling the flight of the balloon will be discussed. In practice the two rate switches shown in Figs. 4 and 4a are used. Switch 152 of Fig. 5 (the switch of Fig. 4) controls the ascent and the switch 154 of Fig. 5 (the switch of Fig. 4a) controls the descent. When switch 152 is closed, as it is during normal ascent, the circuit through relay coil 156 is closed and the relay coil is energized by the relay battery 158. The switch 157 of the relay 156 will open and the coil 159 for operating the ascent valve 78 is not operated and the valve remains closed.

If, however, the rate of ascent drops below a certain level, switch 152 will open permitting the relay switch 157 to move to its normally closed position. The circuit is then completed from the valve coil operating batteries 160 to the valve coil 159 which causes the valve to drop ballast and to increase the free lift and increase the rate of ascent. The circuit from the batteries 160 is completed through the switch 157 through altitude switch 162 which energizes the coil of the relay 164. This closes the switch 165 of relay 164 to complete the circuit from the battery to the valve coil, one side of which is grounded. The batteries are grounded through the main on-off switch 166 which must be closed before the balloon control will operate.

Altitude switch 162 is placed in the relay circuit which controls the relay 164 for purposes of opening the circuit before the balloon has reached floating altitude. If this altitude switch 162 were not placed in the circuit, when the balloon nears its floating altitude and its descent slows down the ballast would continue dropping in an attempt to drive the balloon upwardly and retain its rate of ascent and the balloon would not stop ascending until the ballast is exhausted. Therefore, the altitude switch 162 is set to open sometime before the balloon reaches its floating altitude so that when ascent slows down and rate switch 152 closes, relay 164 will not operate and ballast will not be dropped. In practice the pressure switch may be set to open a considerable time before the balloon reaches altitude. Once the balloon has gained a steady rate of climb and reaches the higher altitudes where temperature inversions are not encountered, the ascent switch is not needed.

Turning now to the circuit which operates the descent ballast valve 80, the descent switch 154 closes when the descent is greater than a predetermined amount. It will be seen from Fig. 4a that this will occur when the balloon drops so rapidly that the atmospheric pressure is increased more rapidly than the air can bleed into the flask. This will create a higher pressure in the annular space 147 and a lower pressure in the well 134 which will force the liquid up over the electrode 132 to complete the circuit. With the circuit complete the rate switch 154 closes and the relay battery 158 is placed in circuit with the relay 168. The normally open relay switch 169 then closes to complete the circuit from the batteries 160 to the valve coil 170, one side of which is grounded. This will cause ballast to be dropped until the rate of descent slows down to where descent switch 154 opens to open relay switch 169.

The rate of descent at which descent switch 154 will close and cause ballast to be dropped is of course regulated by choosing the proper size opening 116 in the flask. This purpose of the descent switch is to obtain a gradual even descent during the night which will take the balloon no lower than a minimum altitude by morning. The gradual descent is shown along line 206 of Fig. 6 where line 213 represents the minimum tolerable altitude which is the minimum altitude at which the balloon payload, i.e., scientific instruments etc., will operate.

It will be noted from Fig. 5 that there is a shunt switch 172 which when closed will complete the circuit to operate the relay 168 whether switch 154 is closed or not. This switch is a shelf type switch shown in detail in Fig. 7. The contact arm 174 is kept off the contact bar 176 of the switch when the balloon is first launched. The contact arm is connected to lead 178 and the contact bar to lead 180 so that when the two engage, the circuit is closed to operate the relay 168 and cause operation of the ballast dropping valve. The operation of this valve by shunt switch 172 is of course prevented during ascent because the contact arm 174 is kept off the bar 176 by the shelf 182. As the balloon ascends, however, the arm drops off the shelf when it reaches the dotted line position indicated at 174a of Fig. 7. Once having dropped off the curve the arm will ride along the insulating portion 184 beneath the shelf and as the balloon again descends it will ride on to the contact area 176.

The purpose of this switch 172 is to cause a drop of ballast when the balloon descends below a certain minimum tolerable altitude and thus keeps the balloon above the altitude. This switch will act even though the balloon's rate of descent were slower than that which would cause operation of the descent switch 154. If, for example, the balloon descends at a very slow rate which is inadequate to operate the rate of descent switch, it may still be carrying a certain amount of ballast which should be dropped to bring the balloon back to floating altitude. If it gets below the minimum altitude, the ballast will be dropped to bring the balloon back regardless of the rate of descent.

When the balloon has flown under control for a certain period of time and the ballast supply is getting low, it is desirable to drop the remainder of the ballast and drive the balloon to its floating altitude without the need of prolonging the accurate control of the flight. This is accomplished by ballast responsive switch shown in detail in Fig. 3. The ballast container 76 is shown containing an amount of ballast 186. The ballast tank contains a float 188 which remains on top of the liquid ballast and which is guided by a vertical guide 190 which projects through a hole in the float. When the float drops to a certain level it engages arm 192 which is connected to a switch 194. This switch is shown in the circuit of Fig. 5. The closing of this switch completes the circuit through the solenoid 164, causing the rate of ascent switch to operate at any altitude. The rate of ascent switch then causes ballast to be dropped whenever the balloon is not rising faster than the rate for which it is set. The balloon is therefore caused to ascend to its floating level where ballast is continually expended until the supply is exhausted.

As was previously stated, when the ballast has been nearly completely expended, use is made of the remaining ballast to drive the balloon to ceiling altitude. Since there is no ballast left the balloon will descend rapidly at nightfall and may descend below the minimum tolerable altitude if left at this altitude. At this point therefore the glide principle is brought into practice.

It is advantageous to get the balloon to as high an altitude as possible at the start of the glide in order to get maximum duration, since the glide principle works best in the stratosphere. Therefore, in order to get this highest possible altitude, any excess weight should be dropped. The radio beacon is a good candidate for this since the dry-cell type primary cells would have been expended and are mostly dead weight. The transmitter is lightweight as compared to the rest of the transmitter package. The transmitter is also relatively cheap and can be expended.

To drop a weight of this size requires some finesse since, under ordinary circumstances, it could cause balloon failure. If released at a lower altitude where the balloon is only partially inflated, the balloon could (1) suffer from the sudden application of lift, or (2) it could rise so rapidly that fabric fluttering would occur which could shatter the film, or (3) it could reach pressure altitude so rapidly that the lifing gas could not be valved rapidly enough and the resulting superpressure could cause the balloon to burst.

If, however, the load were released while the balloon is floating at ceiling, only the first of the above causes for failure could occur since the lifting gas would start valving almost immediately to start reducing the excess lift.

The simultaneous removal of the air excluding appendix 20 with the dropping of the beacon gives a large clear opening for the valving of lifting gas and this helps prevent the balloon from bursting.

The beacon is dropped from the balloon by the firing of squib 64, Fig. 1. This squib is in circuit with switch 198 which is closed by the float 188, Fig. 3, engaging switch arm 198 when the ballast is exhausted. The continual discharge of ballast since the time switch arm 192 was engaged has of course driven the balloon to a high floating altitude to thereby ease the shock of dropping the beacon weight as above described.

The closing of switch 196 when the ballast is exhausted also initiates tearing off the appendix 20.

The apparatus for removing the appendix and obtaining the features of glide of the balloon is shown in detail in Fig. 8. It consists basically of mechanism for tearing the appendix from the balloon so that it is open at the bottom. With the bottom open, air will mix with the gas when the balloon descends, and will keep the balloon fully inflated. It has been found that a considerable stabilizing effect is obtained from the extra air within the balloon. Since this air receives the benefits of solar radiation it obtains a much greater lifting ability than if the balloon were partially deflated containing only pure gas. When the gas mixes with air, the balloon remaining fully inflated will descend each night to a new floating level, remain there the next day expelling gas as the sun's heat expands it, and so proceed earthward in a stepwise glide of several days' duration.

With reference to Fig. 8, the appendix 20 is shown attached along line 18. Tapes 220 have been applied extending from the upper edge of the appendix at 18 to meet at a point 222 on the appendix which is lower than the line 18 so as to form a V. Where the tapes join line 18 a cord 224 is attached to a ring 226 secured to the ends of the tapes. The cord 224 hangs down in a long loop and is attached to a weight 228. The weight is drawn up closely to the ring 226 and secured there by a short link of rope 230 which is connected to a ring 227 fastened to the tapes on the balloon. A cutting squib 232 is connected to the rope 230 to cut it and release the weights 228. The cutting squibs have electrical leads 234 which lead to a battery in series with the ballast switch 196. When this switch closes the squib 232 fires to cut the rope 230 and drop the weight. When the weight drops it gains considerable momentum and gives a sudden jerk to the looped line 224 which pulls on the tapes 220 to tear the appendix 20 from the bottom of the balloon. This creates a large opening formerly covered by the appendix and the resultant vented balloon is shown in detail in Fig. 9.

When the balloon descends, air will valve in through the opening and mix with the gas. By the ram effect of the descending balloon this will keep the balloon inflated and the solar radiation of the sun will heat the mixture of gas and air will add lift to the balloon so that it will continue to glide. The beacon 56 will drop and will then float to earth on the parachute 60. The parachute will slow down its descent so that the heavy weight will not cause damage if it strikes some object on the ground.

Figure 6:
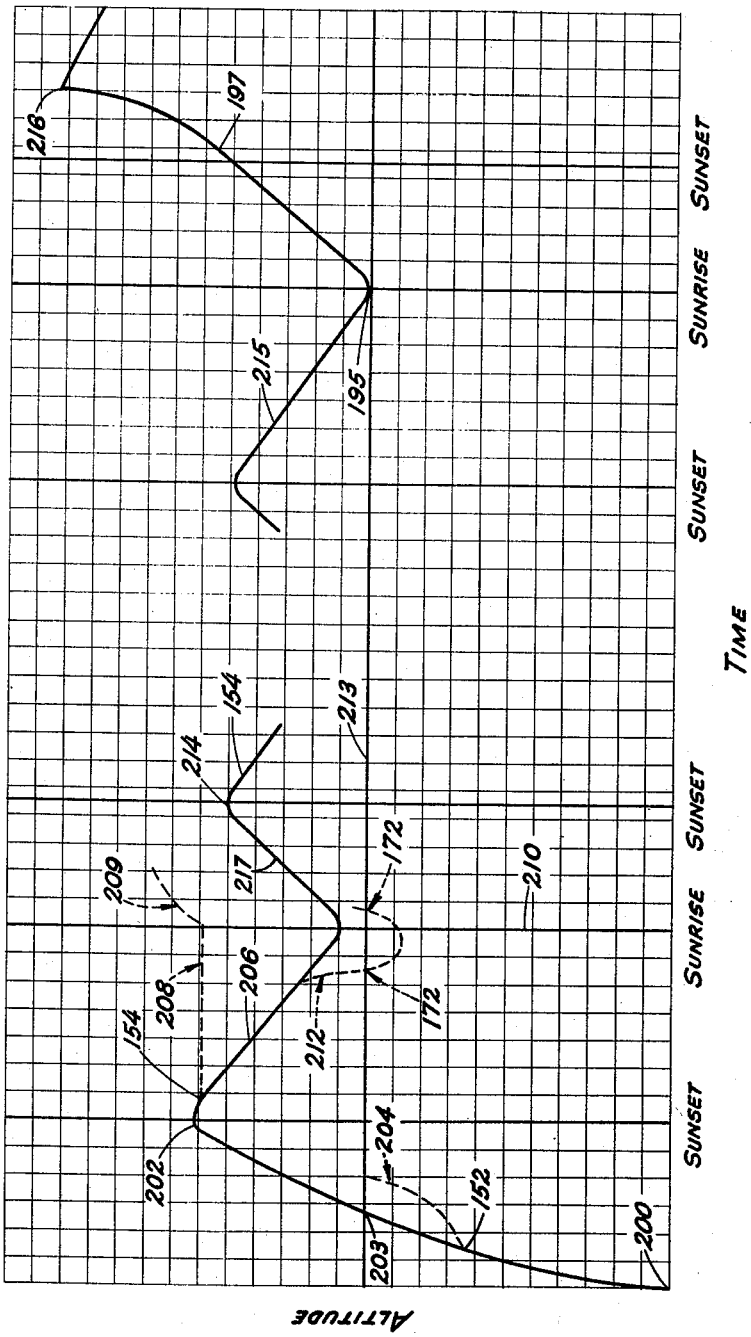
Fig. 6 is a graph illustrating a typical path of flight of a balloon flown according to the teachings of the present invention.

In Fig. 6 the graph of the flight pattern will give an illustration of the flight of a typical balloon and will also serve as a review of the operation of the balloon control circuit. The ordinates are altitude and the abscissa is time.

The balloon is first launched at point 200. As it ascends it is carried upwardly by the influence of the free lift possessed by the tow balloon 68.

Although the balloon may be launched at any time of day it is preferably launched so that it will reach its floating altitude shown at 202 at sunset which will yield optimum ballast conservation. The rate of rise is determined during the early part of ascent by the tow balloon and throughout the ascent the ascent switch insures at least a certain minimum rate of rise. Therefore, the time of reaching maximum altitude can be relatively accurately determined. It will be seen however that launching may occur any time and the solar engine will begin to function after the first sunset regardless of when launched and a very small additional amount of required ballast is the only penalty for flexibility in launching time.

As the balloon rises the air passing the balloon has a ventilation effect which counteracts the effects of solar radiation and reduces the superheat of the gas. Since the balloon rises at a relatively constant rate, the ventilation effect acts to minimize the superheat. If the balloon were allowed to slow down and take on too much superheat the gas would expand beyond the volume of the balloon and the balloon will spill gas through the appendix. Also a more drastic cooling would occur at nightfall and either more ballast will have to be expended to reduce the descent of the balloon or it would descend further than desired.

The amount of ballast which is dropped is substantially equal to the loss of lift due to diffusion of gas through the balloon. The ballast dropped is controlled by the descent switch 154. This switch is set so that the balloon may descend gradually all night and yet not get below the minimum tolerable altitude represented by line 213 in Fig. 6.

The reduced rate of descent also functions to reduce the ventilation effect and thereby reduces the rate of cooling to some extent. The reduced rate of descent also functions to reduce the possibility of flutter of the balloon material from too fast a descent.

In the graph of Fig. 6 showing the pattern of flight, the solid line shows the desired path and the dotted lines show the path which the balloon might assume under certain conditions. It will be noted from the dotted line path 204 that if a balloon during ascent begins to level off and does not continue its rapid rate of ascent, switch 152 will open causing a drop of ballast and thereby increase the free lift of the balloon and cause the balloon to begin ascending more rapidly again.

Before the balloon reaches its minimum tolerable altitude, ascent switch 162 closes about at point 203. This prevents the dropping of ballast when the rate of ascent slows down as the balloon levels off at ceiling.

When the balloon reaches its maximum altitude or ceiling it has acquired only approximately one-half of the superheat possible due to the ventilation of the balloon during ascent. At point 202 when the sun sets, the gas immediately begins cooling and losing volume. This causes the balloon to lose lift because of decreased air displacement and to descend along line 206. When the descent reaches a certain rate, switch 154 closes to cause a drop of ballast. This drop of ballast does not completely compensate for the loss of lift of the balloon due to the contraction of the gas but compensates only in part. It decreases the rate of descent to a rate which will allow the balloon to descend all night without exceeding the altitude fluctuation which can be tolerated.

It will be seen from the dotted line 208 that if sufficient ballast were dropped to completely compensate for the loss of lift, the balloon would, of course, remain on a horizontal path but a considerable amount of ballast would be dropped. When the sun again rises the heat of the sun would cause the gas to expand and the partly deflated balloon would immediately begin to ascend along dotted line 209 lightened by the ballast that had dropped during the night. As the gas continues to expand due to heat received from the sun, it would be spilled out through the appendix valve. Thus if the balloon were controlled to float along path 208 and 209, an excess amount of ballast would be lost during the night and gas spilled during the day.

The balloon as controlled will descend along line 206 during the night. It should be again mentioned at this point that the objective, as before stated, is to obtain a balloon flight of extremely long duration. The objective is not to maintain the balloon in absolutely flat trajectory since this would make it impossible to obtain long duration flight because of the heavy ballast required to offset the sunset and sunrise effect. The altitude does fluctuate between sunsets and sunrises but the change is not hazardous to the balloon and the fluctuations are predictable and a consistent average altitude is maintained.

If for some reason the balloon should have a severe descent such as indicated by the dotted line 212 when the balloon drops below the minimum tolerable level, shown at 213, switch 172 closes to drop ballast regardless of the rate of descent. This prevents the balloon from descending below the minimum tolerable altitude. When the balloon ascends to somewhere within its operating range, switch 172 will again open and the ballast will stop dropping. In normal flight, however, with the controls working properly the minimum altitude switch 172 will not be called into operation.

Returning now to the normal path of travel of the balloon along line 206, when the sun rises the balloon begins to ascend along the line 217 due to the expansion of the gas within the then partially deflated balloon as it takes on heat. This ascent continues during the day, the rate of rise provided by the superheat. The balloon reaches floating altitude at sunset at 214. This may be slightly lower than altitude 202. There the gas again cools and the balloon begins descending. When the descent reaches a certain rate switch 154 again closes. This switch slows down the descent as before. The balloon will oscillate vertically with the period of one day, and with gradually decreasing maximum and minimum altitudes, its descent at night cannot take it below the minimum altitude 213 or ballast will be continually dropped by the operation of switch 172 to maintain constant level flight at that altitude. At the next sunrise it will again acquire superheat which will take it back to its maximum altitude where the daily oscillations will commence again. This process will continue until the ballast is expended to the point where the glide is stated by the action of the switch 194 in Fig. 3.

The closing of switch 194 (at point 195 in Fig. 6) bypasses switch 162, Fig. 5, and the ascent valve is caused to act through the circuit closed by the rate of ascent switch 152 thus driving the balloon to its maximum altitude. During the ascent the remaining ballast is expended to the point where switch 196 in Fig. 3 is activated. It will be understood that switches 194 and 196 may act at any altitude of flight whenever the ballast supply is sufficiently exhausted. For example, switch 194 may close during the night and begin to counteract the descent at that time. When all the ballast is gone the switch 196 closes, e.g. at point 197 in Fig. 6 to jettison the beacon 54 and its batteries. This will drive the balloon higher to point 216. Simultaneously the appendix is ripped from the balloon so that when the balloon descends from 216 the ram effect of the balloon mixes air with the lifting gas. This has a stabilizing effect upon the descent as described above.

Therefore, it will be seen that I have provided an extremely practical altitude control for a balloon which will greatly lengthen the time of flight attainable by a load balloon which can attain high altitudes. The sunset and sunrise effect are compensated for and no unnecessary gas loss is experienced by valving from the appendix.

The altitude control is simple in construction and because of this fact can be made light in weight which is a very important feature in balloon apparatus. By a combination of the proper controlled drop of ballast and the correct time of launching, flights may be achieved which can stay aloft for periods of time which have not, heretofore, been possible.

By controlling the rate of descent during the night and obtaining a uniform rate of descent, the balloon will not descend below a minimum altitude by morning. In addition, the even rate of descent reduces ventilation and flutter effects and consumes a small amount of ballast in accomplishing this. The undesirable effects of solar radiation and night cooling are not felt and satisfactory operation and long flights are accomplished in spite of them.

Reviewing the features of the altitude control which has been named for the purposes of discussion, solar engine, I have found that there are features which may be incorporated with the solar engine into the flight which will cooperatively contribute to obtain a flight of very long duration. As discussed, it is advantageous to keep the amount of superheat acquired by the gas from the sun to a minimum. This is accomplished in part by keeping rates of rise as uniform as possible to obtain the best advantage of the ventilation effects. During original ascent this is accomplished by the rate of ascent switch which drops ballast when the ascent drops below a predetermined rate. A transparent balloon material aids in reducing the heat acquired from the sun and a transparent plastic, such as polyethylene, is excellent for this purpose.

The balloon should be flabby, i.e., assume a rounded shape with a volume no greater than the lifting gas so that it will expand maintaining a streamlined shape as the gas expands. The combination should also include a good air excluding device for the balloon envelope such as a valve appendix which permits the gas escape with internal pressure and prevents air from entering the balloon and mixing with the gas all during the flight. Also essential to obtaining flights of very long duration are the devices including the rate of descent switch which keeps the balloon descending at a substantially uniform rate to reduce the balloon descent with a minimum amount of ballast consumption. The minimum altitude switch also forms an essential part of the system not only in keeping the balloon within functional altitudes but also helping to obtain improved performance reducing ballast consumption and extending the flight. The apparatus for obtaining the "air glide" at the end of the flight dropping a part of the load and removing the appendix succeeds in extending a long duration flight even further after the ballast has been exhausted.

As stated above, these features may be used in various combinations and when all combined in one flight cooperatively contribute to obtain flights of a duration which have heretofore been impossible to obtain.

I have, in the drawings and specification, presented a detailed disclosure of the preferred embodiment of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A control for a balloon in flight carrying a ballast load which may be dropped in parts to decrease the load on the balloon, the control comprising means for dropping ballast which will reduce the load to compensate for a loss of lift which causes the balloon to descend and is due primarily to the cooling of gas which occurs when the sun sets, means to sense the rate of descent, means associated with said rate means and adapted to initiate action of the ballast dropping means when the balloon reaches a rate of descent greater than a predetermined rate and to terminate action of the ballast dropping means when the balloon descent becomes less than said predetermined rate.

2. A control for a balloon in flight which is outfitted with a ballast load which may be dropped in parts to decrease the load, the control comprising means for dropping ballast which will reduce the weight of the load at a rate equavalent to the rate of loss of lift of the balloon due to diffusion of gas through the balloon envelope, and means associated with the ballast dropping means to cause it to drop ballast responsive to the balloon's reaching a rate of descent which exceeds a certain predetermined rate due to the cooling of gas at sunset.

3. A control for a balloon in flight carrying a ballast load disposable in small amounts to decrease the load of the balloon comprising means to sense the rate of ascent of the balloon and to initiate a first signal when the rate falls below a predetermined level, means dropping ballast in response to said first signal for increasing the rate of ascent, means responsive to altitude adapted to prevent dropping ballast in response to a low rate of ascent after the balloon attains a certain predetermined altitude, means for sensing the descent of the balloon and for initiating a second signal when the rate becomes larger than a predetermined amount, and means dropping ballast in response to said second signal to reduce the rate of descent.

4. A control for a balloon in flight carrying a ballast load which may be dropped in parts to decrease the load of the balloon, the control comprising means for sensing the rate of ascent of the balloon and generating an electrical signal when the ascent drops below a predetermined rate, means for dropping ballast when energized by said signal and connected by a circuit to said means for sensing the rate of ascent, a switch in said circuit being normally closed, a pressure responsive means connected to open the switch when the balloon nears its floating altitude to interrupt the signal and terminate the operation of the ballast dropping means when the balloon is at floating altitude.

5. A control for a balloon in flight carrying a ballast load which may be dropped in parts to decrease the load on the balloon, the control comprising means for dropping ballast when energized by an electrical signal and being electrically connected to a circuit for supplying the signal, means for sensing the rate of descent of the balloon and having a switch in said electrical circuit, said rate sensing means closing said circuit when the descent increases above a predetermined rate and opening said circuit once the rate of descent has decreased to substantially said rate, and a pressure responsive switch shunted around the rate sensing switch in said circuit and adapted to close when the balloon descends below a minimum tolerable altitude to place the ballast dropping means in operation regardless of the rate of descent of the balloon to thereby prevent the balloon from descending below a minimum altitude.

6. A control for a balloon in flight carrying a ballast load which may be dropped in parts to increase the free lift of the balloon, the control comprising means for sensing the rate of descent of the balloon and generating a signal when descent increases above a predetermined rate, means responsive to said signal for dropping ballast when energized by said signal means to thereby hold the descent rate below a minimum value and insure a smooth even descent.

7. A control for a balloon in flight carrying ballast which may be dropped in parts to increase the free lift of the balloon, the control comprising means for sensing the rate of descent of the balloon and generating an electrical signal when the rate increases above a predetermined level, means responsive to said signal for dropping ballast when energized by said signal, a load carried by the balloon, means for connecting the load to the balloon being disconnectable upon receipt of a second signal, means sensing the amount of ballast remaining and generating said second signal when the ballast supply reaches a certain value for detaching the load from the balloon upon the receipt of the signal generated by the ballast measuring means.

8. A control for a balloon in flight carrying a ballast load which may be dropped in parts to increase the free lift of the balloon, the control comprising means for sensing the rate of ascent of the balloon and for generating a first signal when the rate of ascent drops below a predetermined value, a first ballast valve adapted to be operative in response to said first signal for releasing ballast at a first rate when the ascent rate drops below said value, altitude responsive means adapted to prevent operation of the first ballast valve after the balloon ascends to a predetermined altitude, means for sensing the rate of descent of the balloon and for generating a second signal when the rate increases above a predetermined value, and a second ballast valve arranged to be operative in responsive to said second signal to drop ballast at a second rate different from said first rate when the rate of descent of the balloon becomes too large.

9. A balloon for carrying a load aloft including ballast which may be dropped in parts to decrease the load comprising means for supporting the ballast load from the balloon, means for dropping said ballast load in parts, means responsive to the rate of ascent of the balloon and arragned to operate said ballast dropping means to drop ballast when the ascent drops below a predetermined rate, means associated with said ballast dropping means to terminate dropping ballast due to a low rate of ascent after the balloon reaches a predetermined altitude less than the maximum altitude of the balloon, means responsive to the descent of the balloon and arranged to operate the ballast dropping means to drop ballast when the descent increases above a predetermined rate, and a fully inflated tow balloon having a gas relief valve and being smaller than said main balloon, said tow balloon attached to the load to provide a major portion of the free lift during the beginning of the balloon ascent.

10. A balloon for carrying a load including disposable ballast, means for suspending the main load and the ballast from the balloon, means for sensing the rate of descent of the balloon and arranged to drop ballast at a predetermined rate when the balloon descends at a rate greater than a predetermined rate, means for suspending a secondary load from the balloon in addition to the main load, and means responsive to the quantity of ballast remaining and operable to separate the secondary load from the balloon and drop it to earth after a certain amount of ballast has been exhausted.

11. An altitude control for a balloon carrying a load aloft to a high altitude comprising means for suspending the load from the balloon including a quantity of ballast which may be dropped in parts to increase the free lift, means responsive to the rate of descent of the balloon and operative to drop said ballast in parts when the descent reaches a certain predetermined rate, and a limit switch operative at a predetermined minimum altitude to drop ballast when the balloon descends below said minimum altitude irrespective of the rate of descent of the balloon to maintain the balloon above said minimum altitude.

12. An altitude control for a balloon filled with lifting gas and carrying a ballast load which may be dropped in parts, the control comprising means for sensing the rate of descent of the balloon, and adapted to begin dropping ballast to cause the balloon to lose weight at a predetermined rate when the balloon attains a rate of descent greater than a predetermined rate, said rate of ballast drop being less than the loss of lift due to the cooling of the lifting gas after sunset.

13. An altitude control for a balloon carrying a load including ballast dispensible in parts to decrease the load comprising a rate of descent sensing apparatus adapted to drop ballast when the balloon reached a predetermined rate of descent and to reserve ballast when the rate became less than said predetermined rate, and means to drop ballast when the balloon descended below a predetermined altitude regardless of rate of descent to keep the balloon at a functional altitude.

14. A balloon for carrying a load aloft for a long duration flight comprising a balloon envelope containing a lifting gas and being flexible and substantially transparent to reduce the amount of heat acquired from the sun, a ballast load suspended from the balloon and dispensible in parts to reduce the load, means attached to the balloon envelope for venting gas with internal pressure and excluding air from the balloon, a rate of ascent measuring device adapted to drop ballast when the balloon ascent decreases below a predetermined rate, means to prevent dropping of ballast by the rate of ascent device after the balloon reaches a predetermined altitude, a rate of descent sensing device adapted to drop ballast during the time the descent rate is greater than a predetermined rate, and means for dropping ballast when the balloon descends from a higher altitude below a predetermined minimum altitude to keep the balloon floating at least above said minimum altitude.

15. A balloon for carrying a load aloft for a long duration flight comprising a balloon envelope containing a lifting gas and being flexible and substantially transparent to reduce the amount of heat acquired from the sun, a ballast load suspended from the balloon and dispensible in parts to reduce the load, means attached to the balloon envelope for venting gas with internal pressure and excluding air from the balloon, a rate of ascent sensing device adapted to drop ballast when the balloon ascent decreases below a predetermined rate, means to prevent dropping of ballast by the rate of ascent device after the balloon reaches a predetermined altitude, and a rate of descent sensing device adapted to drop ballast during the time the descent rate is greater than a predetermined rate.

16. A balloon for carrying a load aloft for a long duration flight comprising a balloon envelope containing a lifting gas and being flexible and substantially transparent to reduce the amount of heat acquired from the sun, a ballast load suspended from the balloon and dispensible in parts to reduce the load, an appendix attached to the balloon envelope for venting gas with internal pressure and excluding air from the balloon, a rate of ascent sensing device adapted to drop ballast when the balloon ascent descreases below a predetermined rate, means to prevent dropping of ballast by the rate of ascent device after the balloon reaches a predetermined altitude, a rate of descent sensing device adapted to drop ballast during the time the descent rate is greater than a predetermined rate, means for dropping ballast when the balloon descends from a higher altitude below a predetermined minimum altitude to keep the balloon floating at least above said minimum altitude, means for dropping at least a portion of the load when the ballast is substantially consumed to send the balloon to a higher altitude, and means for removing the appendix when the ballast is substantially consumed so that air will be rammed into the balloon and mix with the gas when the balloon descends to keep the balloon envelope fully distended.

17. A balloon for carrying a load aloft for a long duration flight comprising a balloon envelope containing a lifting gas and being flexible and substantially transparent to reduce the amount of heat acquired from the sun, a ballast load suspended from the balloon and dispensible in parts to reduce the load, an appendix attached to the balloon envelope for venting gas with internal pressure and excluding air from the balloon, a rate of ascent sensing device adapted to drop ballast when the balloon ascent decreases below a predetermined rate, means to prevent dropping of ballast by the rate of ascent device after the balloon reaches a prdeetermined altitude, a rate of descent sensing device adapted to drop ballast during the time the descent rate is greater than a predetermined rate, and means for removing the appendix when the ballast is substantially consumed so that air will be rammed into the balloon and mix with the gas when the balloon descends to keep the balloon envelope fully distended.

18. A control for a balloon in flight carrying a ballast load which may be dropped in parts to reduce the load on the balloon comprising a device for sensing the rate of ascent of a balloon, ballast dropping means associated with said rate measuring device and adapted to drop ballast when the rate of ascent drops below a predetermined rate, and a pressure responsive device arranged to prevent operation of said ballast dropping before the balloon reaches its maximum altitude.

19. A control for a balloon in flight carrying a ballast load which is dispensible in parts to gradually reduce the load comprising a device for sensing the rate of descent of the balloon, and means for dropping ballast operatively connected to the rate of descent sensing device and adapted to drop ballast when the balloon reaches a predetermined rate of descent.

20. An altitude control for a balloon carrying a load including ballast dispensible in parts to gradually reduce the load comprising a device for sensing the rate of descent of the balloon, means operatively connected to the rate of descent device and adapted to drop ballast when the descent reaches a predetermined rate, and an apparatus responsive to altitude and operatively associated with the ballast dropping means causing it to drop ballast when the balloon descends below a predetermined minimum altitude to keep the balloon above said minimum altitude.

21. An altitude control for a balloon carrying a load including ballast dispensible in parts to gradually reduce the load comprising a device to sense the rate of descent of the balloon, means operatively connected to said rate of descent device and adapted to drop ballast while the descent of the balloon is greater than a predetermined rate, and a minimum altitude control responsive to altitude and operatively associated with said ballast dropping means to drop ballast regardless of rate of descent when the balloon descends and remains below a predetermined minimum altitude.

22. A balloon for carrying a load aloft comprising in combination a main balloon capable of carrying a load to high altitudes, a load with means for securing it to the balloon and including ballast dispensible in parts to gradually reduce the load, an auxiliary tow balloon with means to connect it to the load, said tow balloon having a known lift and providing a substantial portion of the lift during the beginning of the balloon ascent to eliminate the necessity of accurately determining the lift of the main balloon, a device for sensing the rate of ascent of the balloon, and means operatively associated with the rate of ascent device and adapted to drop ballast during the time the ascent is less than a predetermined minimum rate to keep the balloon ascending more rapidly than said minimum rate.

23. An altitude control for a balloon having a gas-venting appendix and carrying a load including ballast dispensible in parts to gradually reduce the load comprising a device for sensing the rate of descent of the balloon, means operatively connected with the rate of descent device and adapted to drop ballast while the balloon descends more rapidly than a predetermined rate, a device for measuring the amount of ballast remaining, and means operatively associated with the ballast measuring device for tearing the appendix from the balloon when the ballast is substantially exhausted to permit air to be rammed into the balloon to mix with the gas when the balloon descends to keep the balloon distended and take greater advantage of the superheat acquired from the sun.

References Cited in the file of this patent

UNITED STATES PATENTS

| | | |
|---|---|---|
| 2,524,567 | Isom | Oct. 3, 1950 |
| 2,742,246 | Mellen | Apr. 17, 1956 |

FOREIGN PATENTS

| | | |
|---|---|---|
| 2,313 | Great Britain | 1877 |